United States Patent
Christmas

(10) Patent No.: US 9,514,517 B2
(45) Date of Patent: Dec. 6, 2016

(54) IMAGE PHASE RETRIEVAL

(71) Applicant: TWO TREES PHOTONICS LIMITED, Milton Keynes (GB)

(72) Inventor: Jamieson Christmas, Milton Keynes (GB)

(73) Assignee: Two Trees Photonics Limited, Buckinghamshire (GB)

( * ) Notice: Subject to any disclaimer, the term of this patent is extended or adjusted under 35 U.S.C. 154(b) by 0 days.

(21) Appl. No.: 14/356,349

(22) PCT Filed: Apr. 12, 2013

(86) PCT No.: PCT/GB2013/000167
§ 371 (c)(1),
(2) Date: May 5, 2014

(87) PCT Pub. No.: WO2013/153354
PCT Pub. Date: Oct. 17, 2013

(65) Prior Publication Data
US 2015/0022526 A1    Jan. 22, 2015

(30) Foreign Application Priority Data

Apr. 12, 2012 (GB) .................................. 1206496.0

(51) Int. Cl.
*G03H 1/08* (2006.01)
*G06T 3/40* (2006.01)
(Continued)

(52) U.S. Cl.
CPC ......... *G06T 3/4053* (2013.01); *G02B 27/0101* (2013.01); *G03H 1/0808* (2013.01);
(Continued)

(58) Field of Classification Search
CPC .................... G03H 1/00; G03H 1/08–1/0808; G03H 1/0841; G03H 1/0866; G03H 1/0891; G03H 1/16; G03H 1/22–1/2205; G03H 1/2294; G03H 1/26; G03H 1/10; G03H 2001/306; G03H 2001/0816; G03H 2001/085–2001/0858; G03H 2001/0875–2001/0883; G03H 2001/2207–2001/221; G03H 2001/2218; G03H 2001/2297; G03H 2210/441; G03H 2225/32–2225/34; G03H 2240/00–2240/11; G03H 2240/13; H04N 8/74; G02B 27/52; G11B 7/0065; G11C 13/042
USPC .......................................... 382/254, 274, 276
See application file for complete search history.

(56) References Cited

U.S. PATENT DOCUMENTS

| | | |
|---|---|---|
| 4,275,454 A | 6/1981 | Klooster, Jr. |
| 7,227,611 B2 | 6/2007 | Hull et al. |

(Continued)

FOREIGN PATENT DOCUMENTS

| | | |
|---|---|---|
| GB | 2 436 676 A | 10/2007 |
| GB | 2438026 A | 11/2007 |

(Continued)

OTHER PUBLICATIONS

Miao et al , Phase Retrieval from the magnitude of the Fourier transforms of nonperiodic objects, (J. Opt. Soc. Am., vol. 15, No. 6, pp. 1662-1669, Jun. 1998).*

(Continued)

*Primary Examiner* — Stephone B Allen
*Assistant Examiner* — Jyotsna Dabbi
(74) *Attorney, Agent, or Firm* — Schwegman Lundberg & Woessner, P.A.

(57) ABSTRACT

A method of processing a pixellated image to retrieve a phase distribution representative of the image. The phase distribution representative of the image is in the Fourier domain. The method includes padding the image pixels with padding, or non-image, pixels to increase the total number of pixels in the pixellated image. The method further includes processing the padding or non-image pixels differently to the image pixels in each iteration of the iterative method.

12 Claims, 5 Drawing Sheets

(51) Int. Cl.
*G02B 27/01* (2006.01)
*G03H 1/22* (2006.01)

(52) U.S. Cl.
CPC .......... *G03H1/2294* (2013.01); *G06T 3/4084* (2013.01); *G02B 2027/014* (2013.01); *G03H 2001/0816* (2013.01); *G03H 2210/20* (2013.01); *G03H 2210/30* (2013.01)

(56) References Cited

U.S. PATENT DOCUMENTS

| | | | |
|---|---|---|---|
| 8,072,488 | B2 | 12/2011 | Cable et al. |
| 8,085,453 | B2 | 12/2011 | Christmas et al. |
| 8,159,733 | B2 | 4/2012 | Christmas et al. |
| 8,654,048 | B2 | 2/2014 | Collings et al. |
| 8,878,759 | B2 | 11/2014 | Crossland et al. |
| 2001/0050787 | A1 | 12/2001 | Crossland et al. |
| 2002/0060831 | A1 | 5/2002 | Gerchberg |
| 2004/0027626 | A1 | 2/2004 | Yamauchi et al. |
| 2004/0042161 | A1 | 3/2004 | Cameron et al. |
| 2004/0223651 | A1* | 11/2004 | Ottesen ............. G06T 9/00 382/232 |
| 2005/0041271 | A1 | 2/2005 | Tomoyoshi |
| 2005/0134709 | A1 | 6/2005 | Ishii et al. |
| 2005/0157188 | A1 | 7/2005 | Kubo |
| 2007/0024999 | A1* | 2/2007 | Crossland et al. ............. 359/859 |
| 2008/0068852 | A1 | 3/2008 | Goihl |
| 2008/0106653 | A1 | 5/2008 | Scott |
| 2008/0192312 | A1 | 8/2008 | Hendricks et al. |
| 2008/0198372 | A1 | 8/2008 | Pan |
| 2009/0002787 | A1 | 1/2009 | Cable et al. |
| 2009/0128875 | A1 | 5/2009 | Christmas et al. |
| 2009/0257104 | A1 | 10/2009 | Cable et al. |
| 2010/0165429 | A1 | 7/2010 | Buckley et al. |
| 2011/0002019 | A1 | 1/2011 | Routley et al. |
| 2011/0157667 | A1 | 6/2011 | Lacoste et al. |
| 2012/0133937 | A1 | 5/2012 | Heintzmann et al. |
| 2013/0022222 | A1 | 1/2013 | Zschau et al. |
| 2013/0265622 | A1 | 10/2013 | Christmas et al. |
| 2014/0253987 | A1 | 9/2014 | Christmas |
| 2015/0009695 | A1 | 1/2015 | Christmas et al. |
| 2015/0346491 | A1 | 12/2015 | Christmas |

FOREIGN PATENT DOCUMENTS

| | | |
|---|---|---|
| GB | 2446852 A | 8/2008 |
| GB | 2 461 294 A | 12/2009 |
| GB | 2 509 180 | 6/2014 |
| JP | H06-027863 | 4/1994 |
| JP | H11-003128 | 6/1999 |
| JP | 2003-515180 A | 4/2003 |
| JP | 2004-538519 A | 12/2004 |
| JP | 2005-181854 A | 7/2005 |
| JP | 2006 301020 A | 11/2006 |
| JP | 2007-523359 A | 8/2007 |
| JP | 2008-544307 A | 12/2008 |
| JP | 2009-536748 A | 10/2009 |
| JP | 2011-508911 A | 3/2011 |
| JP | 2013-524270 A | 6/2013 |
| WO | WO 01/35155 A1 | 5/2001 |
| WO | WO 03/014837 A1 | 2/2003 |
| WO | WO 03/060612 A1 | 7/2003 |
| WO | WO 2005/059881 A2 | 6/2005 |
| WO | WO 2006/134404 A1 | 12/2006 |
| WO | WO 2007/131649 A1 | 11/2007 |
| WO | WO 2007/131650 A1 | 11/2007 |
| WO | WO 2007131650 A1 * | 11/2007 |
| WO | WO 2009/087358 A1 | 7/2009 |
| WO | WO 2009/156752 | 12/2009 |
| WO | WO-2013153354 | 10/2013 |

OTHER PUBLICATIONS

Difato, F., et al., "Spatial Light Modulators for Complex Spatiotemporal Illumination of Neuronal Networks," Neuromethods, 67: 61-81 (2012).

Ferri, L.C., "Visualization of 3D Information with Digital Holography Using Laser Printers," Computers & Graphics, 25:309-321 (2001).

Inoue, T., et al., "LCOS Spatial Light Modulator Controlled by 12-Bit Signals for Optical Phase-Only Modulation," Proceedings of SPIE, International Society for Optical Engineering, vol. 6487, pp. 64870Y-64871Y (2007).

Mias, S. and H. Camon, "A Review of Active Optical Devices: II. Phase Modulation," Journal of Micromechanics and Microengineering, 18(8): 1-22 (2008).

International Search Report and Written Opinion issued in International Application No. PCT/GB2013/000167, "Phase Retrieval", Date of Mailing: Jul. 22, 2013.

Combined Search and Examination Report issued in Great Britain Application No. GB1206496.0, Date of Mailing: Oct. 1, 2012 (6 pages).

Notification of Transmittal of the International Search Report and the Written Opinion of the International Searching Authority, PCT/GB2012/052566, "Iterative Phase Retrieval With Parameter Inheritance," Date of Mailing Dec. 14, 2012.

Combined Search and Examination Report, GB 1118558.4, Dated Mar. 22, 2012.

Restriction Requirement in U.S. Appl. No. 14/351,130, Date of Mailing Oct. 1, 2014.

Notification of Transmittal of the International Search Report and Written Opinion for PCT/GB2013/050274, titled: Lighting Device for Headlights With a Phase Modulator, Date of Mailing: May 7, 2013.

Great Britain Search Report for GB1202123.4, Date of Mailing: Jun. 19, 2013.

Notification of Transmittal of International Search Report and the Written Opinion of the International Searching Authority for Int'l Appl. No. PCT/GB2011/051328, titled: 2D/3D Holographic Display System, Date of Mailing: Sep. 21, 2011.

Notification of Reason(s) for Refusal for Appl. No. 2014-537712, Dispatch Date: Mar. 17, 2015 (with English Abstract).

Notification of Reason(s) for Refusal for Appl. No. 2014-537712, Dispatch Date: Sep. 30, 2014 (with English Abstract).

Buckley, E., et al., "Full Colour Holographic Laser Projector HUD", SID Vehicles and Photons 2008, 15th Annual Symposium on Vehicle Displays, pp. 1-5, Oct. 17, 2008.

Fukaya, N., et al., "Improved Electro-Holographic Display Using Liquid Crystal Devices to Diminish the System Size," Proceedings of International Conference on High Technology : Image Science and Technology, Evolution and Promise, World Techno Fair in Chiba pp. 355-363, Sep. 11, 1996.

"International Application Serial No. PCT/GB2013/000167, International Search Report mailed Jul. 22, 2013", 3 pgs.

"International Application Serial No. PCT/GB2013/000167, Written Opinion mailed Jul. 22, 2013", 7 pgs.

* cited by examiner

IMAGE PHASE RETRIEVAL

This application is the U.S. National Stage of International Application No. PCT/GB2013/000167, filed Apr. 12, 2013, which designates the U.S., published in English, and claims priority under 35 U.S.C. §§119 or 365(c) to Great Britain Application No. 1206496.0, filed Apr. 12, 2012.

FIELD OF THE INVENTION

The present disclosure relates to the field image processing and reproduction, for example using computer-generated holograms. Embodiments disclosed herein generally relate to an iterative method of retrieving phase information from an image, such as a 2D intensity distribution. More specifically, embodiments disclosed herein generally relate to a modified Gerchberg-Saxton algorithm for retrieving phase information in real-time.

BACKGROUND

Light scattered from an object contains both amplitude and phase information. This amplitude and phase information can be captured on, for example, a photosensitive plate by well known interference techniques to form a holographic recording, or "hologram", comprising interference fringes. The "hologram" may be reconstructed by illuminating it with suitable light to form a holographic reconstruction, or replay image, representative of the original object.

It has been found that a holographic reconstruction of acceptable quality can be formed from a "hologram" containing only phase information related to the original object. Such holographic recordings may be referred to as phase-only holograms. Computer-generated holography may numerically simulate the interference process, using Fourier techniques for example, to produce a computer-generated phase-only hologram. A computer-generated phase-only hologram may be used to produce a holographic reconstruction representative of an object.

The term "hologram" therefore relates to the recording which contains information about the object and which can be used to form a reconstruction representative of the object. The hologram may contain information about the object in the frequency, or Fourier, domain.

It has been proposed to use holographic techniques in a two-dimensional image projection system. The system may accept a temporal sequence of 2D image frames as an input. The input may be converted into a real-time sequence of corresponding holograms (for example, phase-only holograms) wherein each hologram corresponds to one image frame. Each hologram may be illuminated using a source of visible light to provide an image on a screen to produce a 2D projection representative of the input. Certain devices allow the writing into them of the holographic data at a fast enough rate that a sequence of images may be formed in real-time to permit viewing of the frames. Accordingly, there may be provided a real-time 2D video projector to project a sequence of image frames using a sequence of computer-generated holograms.

An advantage of projecting video images using phase-only holograms is the ability to control many image attributes via the computation method—e.g. the aspect ratio, resolution, contrast and dynamic range of the projected image. A further advantage of phase-only holograms is that no optical energy is lost by way of amplitude modulation.

A computer-generated phase-only hologram may be "pixellated". That is, the phase-only hologram may be represented on an array of discrete phase elements. Each discrete element may be referred to as a "pixel". Each pixel may act as a light modulating element such as a phase modulating element. A computer-generated phase-only hologram may therefore be represented on an array of phase modulating elements such as a liquid crystal on silicon (LCOS) spatial light modulator (SLM). The LCOS may be reflective meaning that modulated light is output from the LCOS in reflection.

Each phase modulating element, or pixel, may vary in state to provide a controllable phase delay to light incident on that phase modulating element. An array of phase modulating elements, such as a LCOS SLM, may therefore represent (or "display") a computationally-determined phase-delay distribution. If the light incident on the array of phase modulating elements is coherent, the light will be modulated with the holographic information, or hologram. The holographic information may be in the frequency, or Fourier, domain.

Alternatively, the phase-delay distribution may be recorded on a kinoform. The word "kinoform" may be used generically to refer to a phase-only holographic recording, or hologram.

The phase delay may be quantised. That is, each pixel may be set at one of a discrete number of phase levels.

The phase-delay distribution may be applied to an incident light wave (by illuminating the LCOS SLM, for example) and reconstructed. The position of the reconstruction in space may be controlled by using a optical Fourier transform lens, to form the holographic reconstruction, or "image", in the spatial domain. Alternatively, no Fourier transform lens may be needed if the reconstruction takes place in the far-field.

A computer-generated hologram may be calculated in a number of ways, including using algorithms such as Gerchberg-Saxton. The Gerchberg-Saxton algorithm may be used to derive phase information in the Fourier domain from amplitude information in the spatial domain (such as a 2D image). That is, phase information related to the object may be "retrieved" from intensity, or amplitude, only information in the spatial domain. Accordingly, a phase-only holographic representation of an object in the Fourier domain may be calculated.

The holographic reconstruction may be formed by illuminating the Fourier domain hologram and performing an optical Fourier transform, using a Fourier transform lens, for example, to form an image (holographic reconstruction) at a reply field such as on a screen.

FIG. 1 shows an example of using a reflective SLM, such as a LCOSSLM, to produce a holographic reconstruction at a replay field location, in accordance with the present disclosure.

A light source (110), for example a laser or laser diode, is disposed to illuminate the SLM (140) via a collimating lens (111). The collimating lens causes a generally planar wavefront of light to become incident on the SLM. The direction of the wavefront is slightly off-normal (e.g. two or three degrees away from being truly orthogonal to the plane of the transparent layer). The arrangement is such that light from the light source is reflected off a mirrored rear surface of the SLM and interacts with a phase-modulating layer to form an exiting wavefront (112). The exiting wavefront (112) is applied to optics including a Fourier transform lens (120), having its focus at a screen (125).

The Fourier transform lens (120) receives a beam of phase-modulated light exiting from the SLM and performs a frequency-space transformation to produce a holographic reconstruction at the screen (125) in the spatial domain.

In this process, the light—in the case of an image projection system, the visible light—from the light source is distributed across the SLM (140), and across the phase modulating layer (i.e. the array of phase modulating elements). Light exiting the phase-modulating layer may be distributed across the replay field. Each pixel of the hologram contributes to the replay image as a whole. That is, there is not a one-to-one correlation between specific points on the replay image and specific phase-modulating elements.

The Gerchberg Saxton algorithm considers the phase retrieval problem when intensity cross-sections of a light beam, $I_A(x,y)$ and $I_B(x,y)$, in the planes A and B respectively, are known and $I_A(x,y)$ and $I_B(x,y)$ are related by a single Fourier transform. With the given intensity cross-sections, an approximation to the phase distribution in the planes A and B, $\Phi_A(x,y)$ and $\Phi_B(x,y)$ respectively, is found. The Gerchberg-Saxton algorithm finds solutions to this problem by following an iterative process.

The Gerchberg-Saxton algorithm iteratively applies spatial and spectral constraints while repeatedly transferring a data set (amplitude and phase), representative of $I_A(x,y)$ and $I_B(x,y)$, between the spatial domain and the Fourier (spectral) domain. The spatial and spectral constraints are $I_A(x,y)$ and $I_B(x,y)$ respectively. The constraints in either the spatial or spectral domain are imposed upon the amplitude of the data set. The corresponding phase information is retrieved through a series of iterations.

It is desirable to provide a method of phase retrieval which more rapidly converges on a hologram of acceptable quality and/or provides improved reconstruction quality after a given number of iterations.

SUMMARY OF THE INVENTION

Aspects of the invention are defined in the appended independent claims.

In summary, aspects of the present disclosure relates to a method of processing a pixellated image to retrieve a phase distribution representative of the image in the Fourier, or frequency, domain.

The inventors have recognised that the phase distribution representative of the image may be improved by increasing the number of pixels in the hologram plane by adding padding, or non-image, pixels. The inventors have further identified several advantageous methods for processing the padding, or non-image, pixels to suppress the noise contained in the padding.

In embodiments, it is found that the number of iterations of an iterative algorithm, such as a modified Gerchberg-Saxton algorithm, required to converge on a hologram suitably representative of the input image is reduced. That is, when reconstructed, the hologram produces a reconstructed image of acceptable quality. It is further found that the quality of the reconstructed image is improved for the same number of iterations.

A hologram may be considered acceptable if the mean squared error value is less than a predetermined threshold or the peak signal to noise ratio is greater than a predetermined threshold.

Embodiments disclosed herein relate to projection of a 2D video image including real-time retrieval of a phase distribution (hologram) in relation to each frame of the video sequence. Accordingly, only a finite amount of time is available to calculate the hologram and therefore only a finite number of iterations of the method may be performed before the next frame must be projected. This amount of time may be related to the inter-frame time, for example.

BRIEF DESCRIPTION OF THE DRAWINGS

Embodiments of the present invention will now be described to the accompanying drawings in which.

In the figures like reference numerals referred to like parts.

DETAILED DESCRIPTION OF THE DRAWINGS

Holographically-generated 2D video images are known to possess significant advantages over their conventionally-projected counterparts, especially in terms of definition and efficiency. However, the computational and hardware complexity of the current hologram generation algorithms have previously precluded their use in real-time applications. Recently these problems have been solved—see, for example, published PCT application WO 2005/059881 incorporated herein by reference.

Modified algorithms based on Gerchberg-Saxton have been developed—see, for example, co-pending published PCT application WO 2007/131650 incorporated herein by reference.

These improved techniques are able to calculate holograms at a sufficient speed that 2D video projection can be realised. Embodiments described herein relate to 2D video projection using a computer-generated hologram calculated using such a modified Gerchberg-Saxton algorithm.

Figure 1:
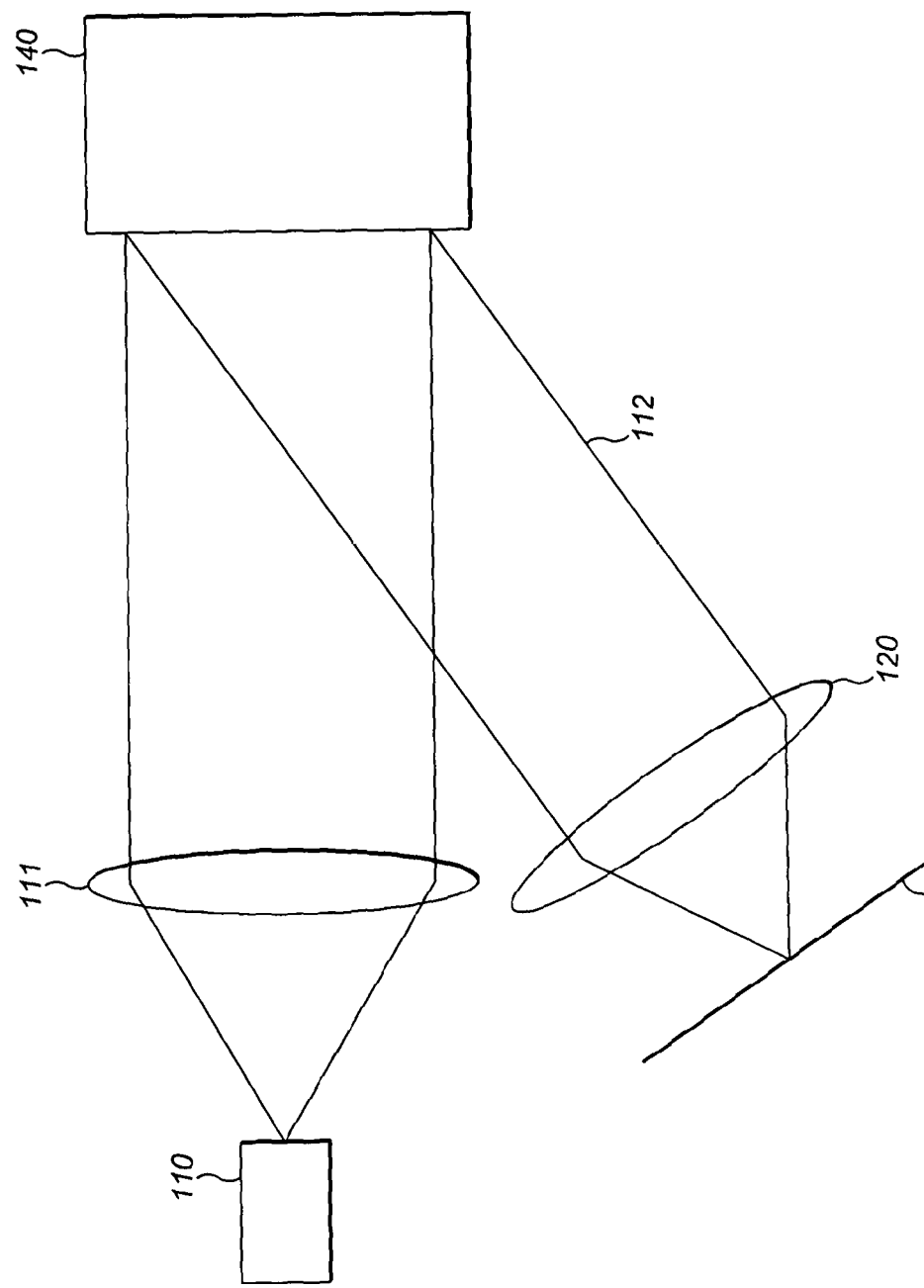
FIG. 1 is a schematic showing a reflective SLM, such as a LCOS, produce a holographic reconstruction at a replay field location.
Figure 2:
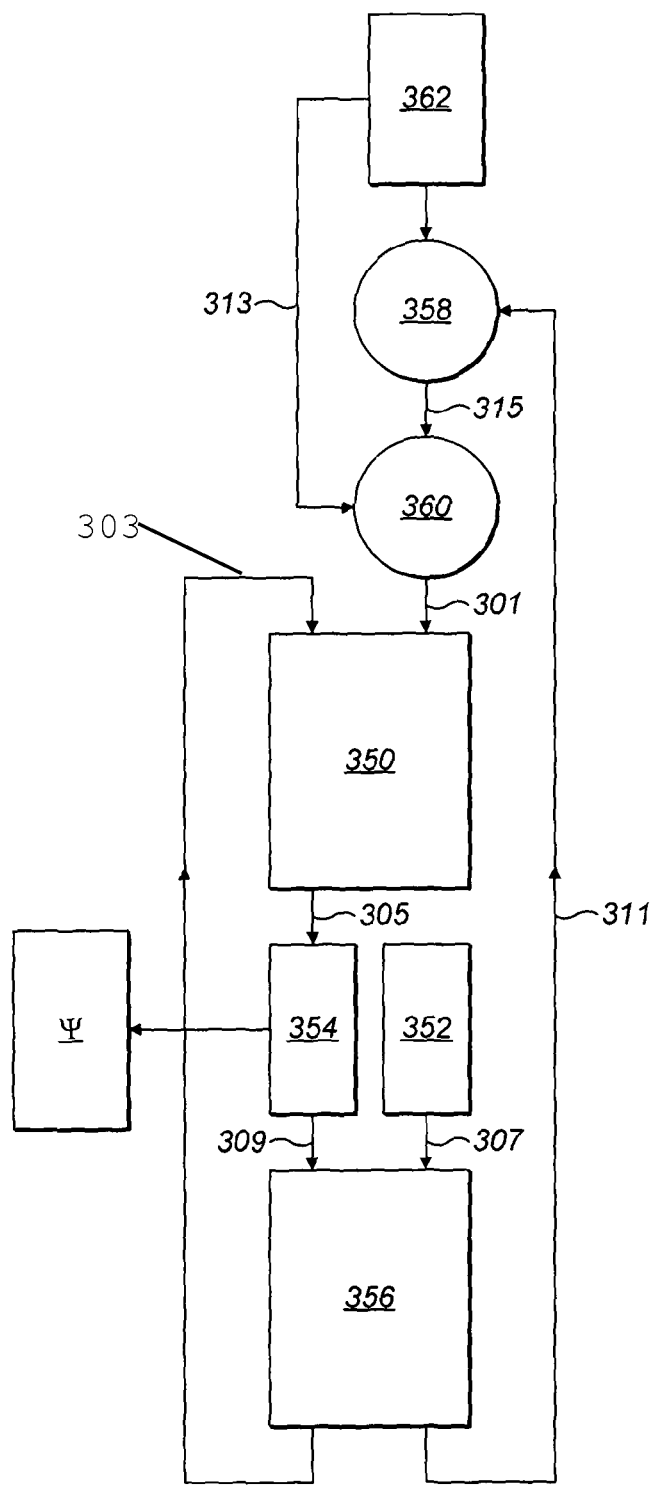
FIG. 2 is a chart showing the function of a modified Gerchberg-Saxton algorithm.

FIG. 2 shows a modified algorithm which retrieves the phase information ψ[u,v] of the Fourier transform of the data set which gives rise to a known amplitude information T[x,y] 362. Amplitude information T[x,y] 362 is representative of a target image (e.g. a photograph). The phase information ψ[u,v] is used to produce a holographic representative of the target image at an image plane.

Since the magnitude and phase are intrinsically combined in the Fourier transform, the transformed magnitude (as well as phase) contains useful information about the accuracy of the calculated data set. Thus, the algorithm may provided feedback on both the amplitude and the phase information.

The algorithm shown in FIG. 2 can be considered as having a complex wave input (having amplitude information 301 and phase information 303) and a complex wave output (also having amplitude information 311 and phase information 313). For the purpose of this description, the amplitude and phase information are considered separately although they are intrinsically combined to form a data set. It should be remembered that both the amplitude and phase information are themselves functions of the spatial coordinates (x,y) for the farfield image and (u,v) for the hologram, both can be considered amplitude and phase distributions.

Referring to FIG. 2, processing block 350 produces a Fourier transform from a first data set having magnitude information 301 and phase information 303. The result is a second data set, having magnitude information and phase information $\psi_n[u,v]$ 305. The amplitude information from processing block 350 is set to a distribution representative of the light source but the phase information $\psi_n[u,v]$ 305 is retained. Phase information 305 is quantised by processing block 354 and output as phase information $\psi[u,v]$ 309. Phase information 309 is passed to processing block 356 and combined with the new magnitude by processing block 352. The third data set 307, 309 is applied to processing block 356 which performs an inverse Fourier transform. This produces a fourth data set $R_n[x,y]$ in the spatial domain having amplitude information $|R_n[x, y]|$ 311 and phase information $\angle R_n[x, y]$ 313.

Starting with the fourth data set, its phase information 313 forms the phase information of a fifth data set, applied as the first data set of the next iteration 303'. Its amplitude information $R_n[x,y]$ 311 is modified by subtraction from amplitude information $T[x,y]$ 362 from the target image to produce an amplitude information 315 set. Scaled amplitude information 315 (scaled by $\alpha$) is subtracted from target amplitude information $T[x,y]$ 362 to produce input amplitude information $\eta[x,y]$ 301 of the fifth data set for application as first data set to the next iteration. This is expressed mathematically in the following equations:

$$R_{n+1}[x, y] = F'\{\exp(i\psi_n[u, v])\}$$

$$\psi_n[u, v] = \angle F\{\eta \cdot \exp(i\angle R_n[x, y])\}$$

$$\eta = T[x, y] - \alpha(|R_n[x, y]| - T[x, y])$$

Where:
F' is the inverse Fourier transform.
F if the forward Fourier transform.
R is the replay field.
T is the target image.
$\angle$ is the angular information.
$\Psi$ is the quantized version of the angular information.
$\epsilon$ is the new target magnitude, $\epsilon \geq 0$
$\alpha$ is a gain element ~1

The gain element $\alpha$ may be predetermined based on the size and rate of the incoming target image data.

Figure 3:
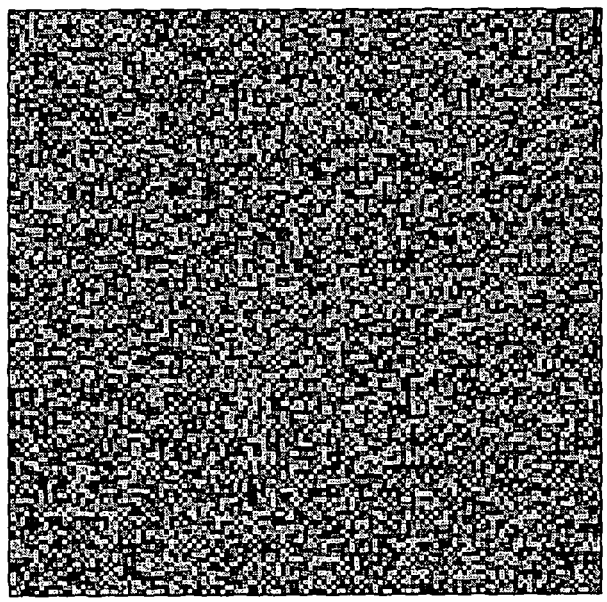
FIG. 3 shows an example random phase seed.

In the absence of phase information from the preceding iteration, the first iteration of the algorithm uses a random phase generator to supply random phase information as a starting point. FIG. 3 shows an example random phase seed.

In a modification, the resultant amplitude information from processing block 350 is not discarded. The target amplitude information 362 is subtracted from amplitude information to produce a new amplitude information. A multiple of amplitude information is subtracted from amplitude information 362 to produce the input amplitude information for processing block 356.

Further alternatively, the phase is not fed back in full and only a portion proportion to its change over the last two iterations is fed back.

These modifications to the Gerchberg-Saxton algorithm relate to feeding back parameters within the phase retrieval calculation for a particular frame. This is distinct from inheriting parameters related to the phase retrieval calculation for the preceding frame which may be referred to as "frame inheritance".

In summary, there is provided an improved method of phase retrieval. This method may be used in conjunction with existing phase retrieval algorithms, such as Gerchberg-Saxton or a modified version of Gerchberg-Saxton.

Traditionally, Gerchberg-Saxton algorithms have been used in a so-called "one-to-one" mode. That is, the number of pixels in the holographic reconstruction is equal to the number of pixels in the hologram. Gerchberg-Saxton based algorithms use a Fast Fourier Transform (FFT). Therefore, the number of pixels in the image for reconstruction (e.g. the input photograph) must match the number of pixels in the hologram.

Figure 4:
FIG. 4 shows an example padded image.

The image for reconstruction may be 128×128 pixels, for example. In embodiments the final image reconstruction quality is improved by increasing the number of pixels in the hologram plane. It may be advantageous for the corresponding hologram to contain 256×256 pixels (or 512×512 pixels), for example. To achieve this, the input amplitude distribution for the first iteration would need to be increased in size from 128×128 pixels to 256×256 pixels. In embodiments, this is achieved by forming a border around the image for reconstruction (e.g. the input photograph). This technique may be referred to as "padding". In alternative embodiments, internal padding is used; for example, every other pixel in a row or column, may be formed of "padding". The "padding" may be uniform or non-uniform. The padded area may take any symmetric or non-symmetric shape. In summary, there are therefore provided embodiments in which a plurality of pixels in the hologram do not contain image content—these pixels may be referred to as "padding pixels" or "non-image pixels" and may be contrasted with "image pixels" which contain information related to the object whose image is to be reconstructed In embodiments, the initial image for reconstruction is padded with a uniform intensity border as shown in FIG. 4. This may be referred to as "constant padding". However, unexpectedly it is found that, despite the increased number of pixels in the hologram, in some cases the resulting mean squared error in the reconstruction is actually increased by using this type of padding. It is found that the padding contains a very small amount of noise in it, indicating that the algorithm is also trying to optimise the padding pixels to unity, in this example. This may indicate that when using phase only modulation to create large even areas of illumination, achieving a good quality result is difficult. Accordingly, with this method, computation power is wasted trying to optimise the border. Embodiments of the present disclosure relate to methods of suppressing the negative effects of noise in the padding pixels and therefore improving the quality of the reconstruction.

There has been tried a method known as "self-setting padding" in which the padding pixels, such as a border of padding pixels, are not changed by the feedback step of the algorithm. More specifically, the padding pixels of amplitude information $R_n[x,y]$ 311 of the $n^{th}$ iteration are not modified by subtraction to produce the input amplitude information for the $(n+1)^{th}$ iteration. In other words, the amplitude value of each padding pixels is fed back without modification. In contrast, the amplitude value of each image pixel of $R_n[x,y]$ is processed by subtraction as described above in relation to FIG. 2. This effectively allows the algorithm to determine how the noise is distributed in the padding region. This embodiment may be referred to as "self-setting padding". It is found that using "self-setting padding" the algorithm settles more quickly (typically in less than 7 iterations, compared to 60 iterations). That is, the mean squared error in the reconstruction (when compared to the input image) converges more rapidly. In other words, fewer iterations are required to reach a reconstruction of a previously set high quality.

However, in some case, the mean squared error in the reconstruction may be increased by using self-setting padding. The inventors have identified that this is because the noise in the padding is heavily dominated by the results of the first few iterations of the algorithm (when the random seed phase distribution is dominating the reconstruction quality). This padding noise then works against the algorithm to slow down or prevent achieving a high quality result.

In embodiments, the initial values of the padding pixels for the first iteration of the algorithm are pseudo-random, similar to the random seed shown in FIG. 3; this may be referred to as a random noise field. In other embodiments, the initial values of the padding pixels are the same; this may be referred to as a uniform intensity field. The values of the padding pixels in the subsequent iterations are, of course, determined by the algorithm.

Figure 5:
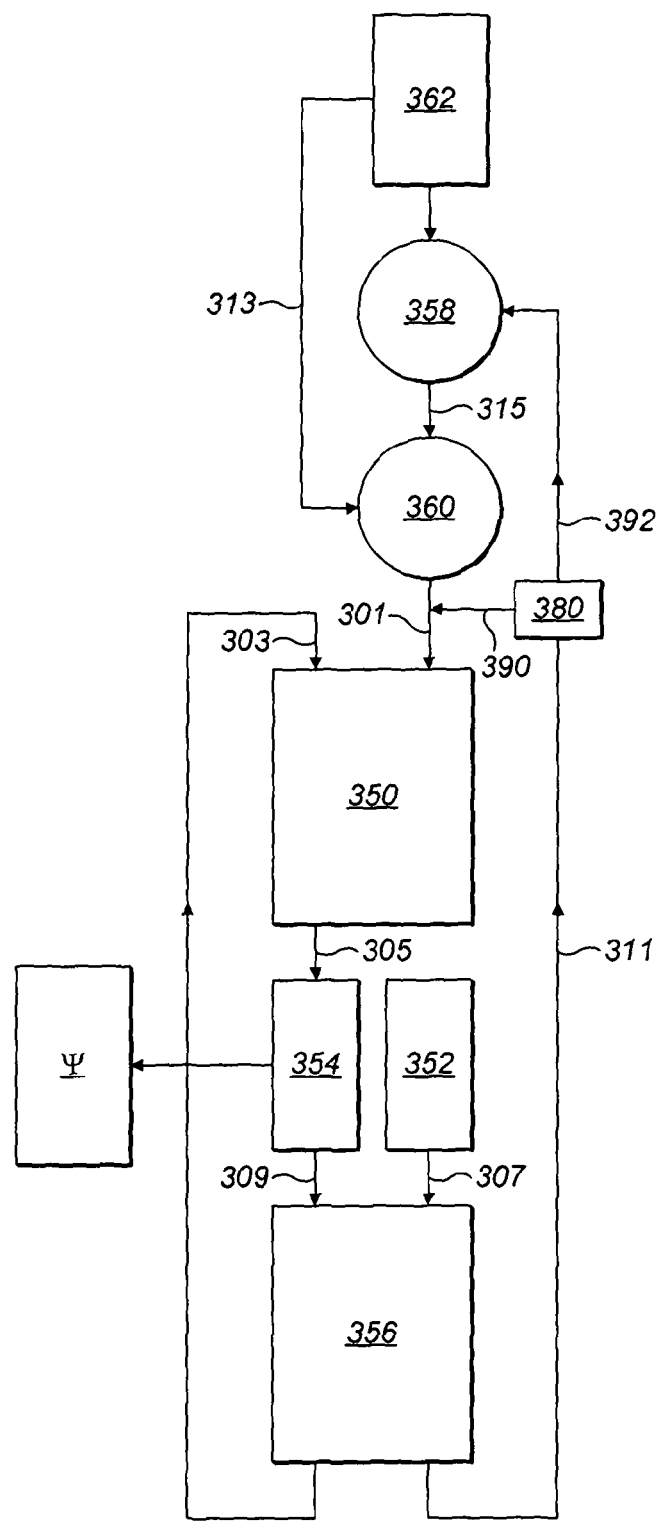
FIG. 5 shows an method in accordance with embodiments of the present disclosure.

In embodiments, the padding pixels of $R_n[x,y]$ 311 from the $n^{th}$ iteration are subject to an additional processing step 380, shown in FIG. 5, to form modified padding pixels 390. The image pixels 392 are fed back to step 358 and processing as previously described. The image pixels 392 and modified padding pixels 390 are recombined to form the complete input 301 of the (n+1) iteration. The skilled person will readily understand how the system may be arranged to process the padding pixels and image pixels differently by, for example, having prior knowledge of the padding arrangement—i.e. which pixels are padding pixels and which are image pixels.

In an embodiment, in order to try and counter noise in the padding working against the algorithm, the padding pixels are attenuated, or damped, by a constant attenuation factor. More specifically, processing step 380 multiples each padding pixel by an attenuation factor greater than 0 but less than 1 (for example, 0.5 to 0.9 such as 0.8). The inventors have found that this suppresses the negative effects caused by noise in the padding. Accordingly, a substantial decrease in the mean squared error of the reconstruction was found in this embodiment. Furthermore, this embodiment retains the above advantage of a self-setting padding: namely, reduced iterations (more rapid convergence).

In an embodiment, additional processing step 380 attenuates, or damps, the padding pixels by a variable attenuation factor, $\beta$ (greater than 0 but less than 1). In examples, the attenuation factor is dependent on the iteration number of the algorithm. Further advantageously, the attenuation factor is increased on each iteration. That is, the amount of attenuation is decreased with each iteration. In examples, the attenuation factor for the $n^{th}$ iteration is less than the attenuation factor for the $(n+1)^{th}$ iteration. This is found to be effective because the algorithm is convergent.

In an embodiment, the attenuation factor $\beta$ and/or gain $\alpha$ used by the algorithm are determined by the iteration number. In an example, the values of $\alpha$ and/or $\beta$ for each iteration number are determined by pre-calculation (or calibration). In an example, the pre-calculation is conducted based on some prior knowledge of the images which can be expected as inputs for the phase retrieval algorithm during operation. For example, the calibration algorithm may be provided, or pre-fed, with a finite number of example images for reconstruction. The calibration algorithm will then determine preferred, or optimised, values of $\alpha$ and/or $\beta$ for each iteration number. In an example, this is achieved by summing the resulting phase retrieval image metrics for a finite number of images together and determining the optimise $\alpha$ and/or $\beta$ for each iteration. In another example, it may be that one image is sufficiently representative of the images which can be expected during operation. The preferred, or optimum, values of $\alpha$ and/or $\beta$ may be determined using any suitable metric or by any suitable technique such as maximising contrast, maximising energy in the image pixels or minimising energy in the padding pixels, for example. It can be understood that the optimised values of $\alpha$ and/or $\beta$ depend on the type of images which can be expected for reconstruction. In this way, the phase retrieval algorithm may be tuned, or calibrated, to the type of inputs expected using a finite number of representative images. In other embodiments, the gain, $\alpha$, is determined as above (as a function of the iteration number, for example) for an unpadded image.

In an embodiment, additional processing step 380 changes the value of padding pixels have a value greater than a predetermined threshold to a predetermined value. This technique may be referred to as "clipping". In examples, padding pixels have a value greater than 25% of the maximum pixel value are set by additional processing step 380 to unity or some other predetermined value such as 25% maximum. This has the effect of suppressing the most dominant padding pixels and therefore suppressing the noise in the padding.

In an embodiment, additional processing step 380 replaces, or overwrites, the value of each padding pixels. In example, the replacement values is a predetermined array of pseudo-random values such as a random seed. This replacement random seed may optionally have a peak value less than a predetermined value such as 25% the maximum pixel value. The replacement random seed may optionally be the same as the initial random seed for the padding pixels.

In an embodiment, which is a modification of the preceding embodiment, the replacement random seed is a new random seed of values. That is, the replacement random seed for the padding pixels is different to the initial random seed and/or the random seed used for a previous iteration of the algorithm. The inventors found that this further enhanced the performance of the algorithm and therefore the resultant image quality. The fourth and fifth embodiments may be referred to as "random padding".

Embodiments of the present disclosure were compared by calculating the mean squared error in the reconstruction. For the purpose of this comparison, a modified version of the Gerchberg-Saxton (GS) algorithm was used.

| | Original GS | Modified GS | Constant padding | Self-setting padding | Random padding |
|---|---|---|---|---|---|
| Error | 909.4 | 199.4 | 204.4 | 109.58 | 54.4 |

It is interesting to note that the number of pixels in the target image has increased by a factor of four (increasing from the original 128×128 to 256×256 pixels) and the mean squared error has decreased by almost a factor of four indicating that there may be a linear relationship between the number of pixels and the reconstruction error.

In embodiments, the number of iterations required to converge on the final hologram is significantly decreased. For example, the number of iterations of the algorithm may be decreased from 60 to circa 7. Accordingly, valuable processing power and time may be saved.

In embodiments, necessitating fewer iterations of the modified Gerchberg-Saxton algorithm, the phase value associated with each pixel was advantageously quantised into one of no more than 64 levels to ensure optimised reconstruction quality.

The inventors have found that, in a further improvement of the modified Gerchberg-Saxton algorithm using a self-setting border for image padding, the ratio between the target image width and the border width is 75-90% (optionally, 83%) and/or the gain, α, used in the algorithm is 0.5 to 0.9 (optionally, 0.775). However, as the skilled person will understand, the precise optimum values are likely to be image dependent.

The inventors have also found that, in a further improvement of the modified Gerchberg-Saxton algorithm using a random noise border for image padding, the ratio between the target image width and the border width is 75-90% (optionally, 82%) and/or the gain, α, used in the algorithm is 0.5 to 0.9 (optionally, 0.670) and/or the border noise peak value is 40 to 70 (optionally, 59). However, as the skilled person will understand, the precise optimum values are likely to be image dependent.

The inventors further determined that, optionally, the optimum peak random noise value to be used in the border for any given image RMS value (x) should be less than 60 and, optionally, satisfy the equation:

$$P_{noise} = 0.4791\, x - 1.6453.$$

The Peak Signal to Noise Ratio (PSNR) is a standard method for quantifying image quality where CODECs, such as JPEGs, are used. The higher the PSNR, the better the processed image. For comparison purposes the values of PSNR which are generated as result of lossy image compression are typically between 30 and 50 dB. For wireless transmission (such as satellite or terrestrial broadcast) acceptable values are considered to be between 20 dB and 25 dB. The performance of the further improved modified GS algorithms with borders was quantified and example results are shown below.

|  | Image quality (mean squared error) | PSNR | Image efficiency |
| --- | --- | --- | --- |
| Modified GS with self-setting border | 35.14 | 32.67 dB | 70% |
| Modified GS with random border | 99.71 | 28.14 dB | 85% |

The image efficiency is calculated as the amount of light present in the image as a percentage of the total light in the reconstruction; this is not diffraction efficiency which would also consider the power lost in to the higher orders.

Results show a substantial image quality difference between the two types of padding; however this difference comes at the expense of the image efficiency.

The quality of the reconstructed hologram may also be affect by the so-called zero order problem which is a consequence of the diffractive nature of the reconstruction. Such zero-order light can he regarded as "noise" and includes for example specularly reflected light, and other unwanted light from the SLM.

This "noise" is generally focussed at the focal point of the Fourier lens, leading to a bright spot at the centre of a reconstructed hologram. Conventionally, the zero order light is simply blocked out however this would clearly mean replacing the bright spot with a dark spot.

However as the hologram contains three dimensional information, it is possible to displace the reconstruction into a different plane in space—see, for example, published PCT application WO 2007/131649 incorporated herein by reference.

Whilst embodiments described herein relate to displaying one hologram per frame, the present disclosure is by no means limited in this respect and more than one hologram may be displayed on the SLM at any one time.

For example, embodiments implement the technique of "tiling", in which the surface area of the SLM is further divided up into a number of tiles, each of which is set in a phase distribution similar or identical to that of the original tile. Each tile is therefore of a smaller surface area than if the whole allocated area of the SLM were used as one large phase pattern. The smaller the number of frequency component in the tile, the further apart the reconstructed pixels are separated when the image is produced. The image is created within the zeroth diffraction order, and it is preferred that the first and subsequent orders are displaced far enough so as not to overlap with the image and may be blocked by way of a spatial filter.

As mentioned above, the image produced by this method (whether with tiling or without) comprises spots that form image pixels. The higher the number of tiles used, the smaller these spots become. If one takes the example of a Fourier transform of an infinite sine wave, a single frequency is produced. This is the optimum output. In practice, if just one tile is used, this corresponds to an input of a single phase of a sine wave, with a zero values extending in the positive and negative directions from the end nodes of the sine wave to infinity. Instead of a single frequency being produced from its Fourier transform, the principle frequency component is produced with a series of adjacent frequency components on either side of it. The use of tiling reduces the magnitude of these adjacent frequency components and as a direct result of this, less interference (constructive or destructive) occurs between adjacent image pixels, thereby improving the image quality.

Preferably, each tile is a whole tile, although it is possible to use fractions of a tile.

Although embodiments relate to variants of the Gerchberg-Saxton algorithm, the skilled person will understand that other phase retrieval algorithms may implement the improved method disclosed herein.

The skilled person will understand that the improved method disclosed herein is equally applicable to the calculation of a hologram used to form a three-dimensional reconstruction of an objection.

Equally, the present disclosure is not limited to projection of a monochromatic image.

A colour 2D holographic reconstruction can be produced and there are two main methods of achieving this. One of these methods is known as "frame-sequential colour" (FSC). In an FSC system, three lasers are used (red, green and blue) and each laser is fired in succession at the SLM to produce each frame of the video. The colours are cycled (red, green, blue, red, green, blue, etc.) at a fast enough rate such that a human viewer sees a polychromatic image from a combination of the three lasers. Each hologram is therefore colour specific. For example, in a video at 25 frames per second, the first frame would be produced by firing the red laser for $1/75^{th}$ of a second, then the green laser would be fired for $1/75^{th}$ of a second, and finally the blue laser would be fired for $1/75^{th}$ of a second. The next frame is then produced, starting with the red laser, and so on.

An alternative method, that will be referred to as "spatially separated colours" (SSC) involves all three lasers being fired at the same time, but taking different optical paths, e.g. each using a different SLM, or different area of a single SLM, and then combining to form the colour image.

An advantage of the frame-sequential colour (FSC) method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC (spatially separated colours) method is that the image is brighter due to all three lasers being fired at the same time. However, if due to space limitations it is required to use only one SLM, the surface area of the SLM can be divided into three equal parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced.

The skilled person will understand that a user may view a real image or virtual image of the holographic reconstruction.

Embodiments in accordance with the present disclosure may be implemented in a head-up display.

Figure 6:
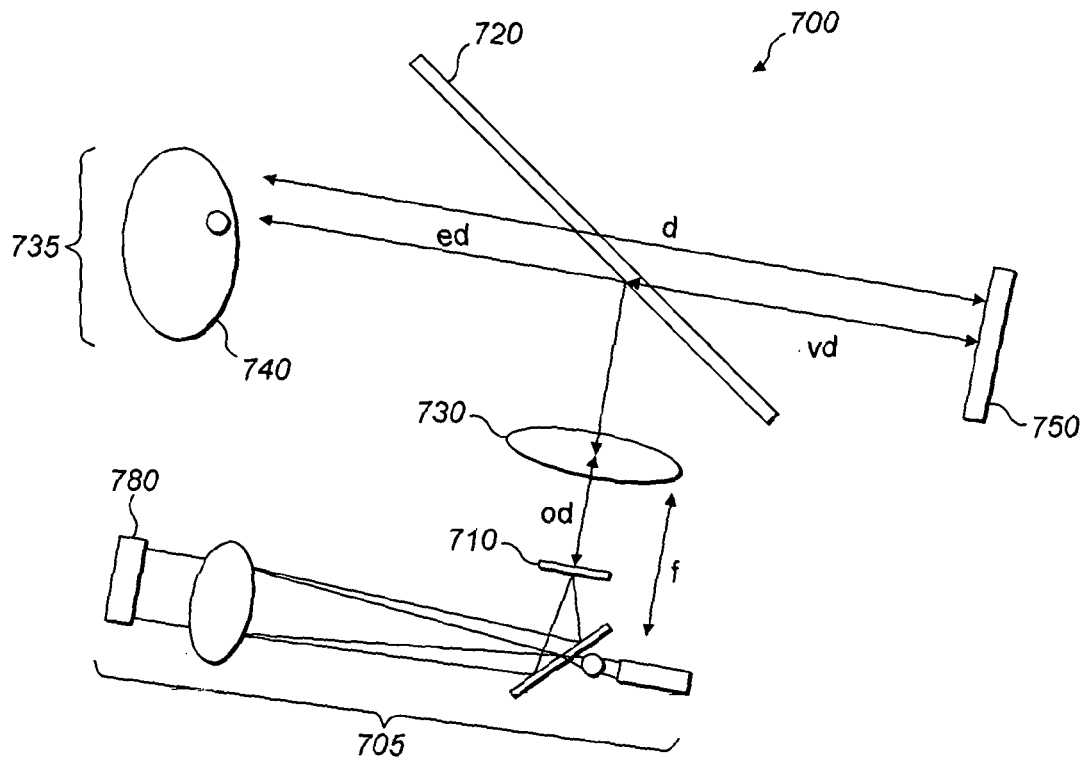
FIG. 6 shows an image projection system in accordance with embodiments.

FIG. 6 shows a head-up display (700) having an SLM based system (705) for providing a real image of a holographic reconstruction (710). The holographic reconstruction is formed at a so-called replay field.

The display consists of an optical combiner (720) and a lens (730) disposed between the holographic reconstruction (710) and the combiner (720). The arrangement is such that a viewer (740) looking towards the combiner (720) will see a virtual image (750) of the holographic reconstruction (710) at a distance d from the viewer and behind the combiner (720). Such a system can be used for example in a head-up display or head-mounted display.

In embodiments, the SLM is a Liquid Crystal over silicon (LCOS) device. LCOS SLMs have the advantage that the signal lines, gate lines and transistors are below the mirrored surface, which results in high fill factors (typically greater than 90%) and high resolutions.

LCOS devices are now available with pixels between 4.5 µm and 12 µm.

Figure 7:
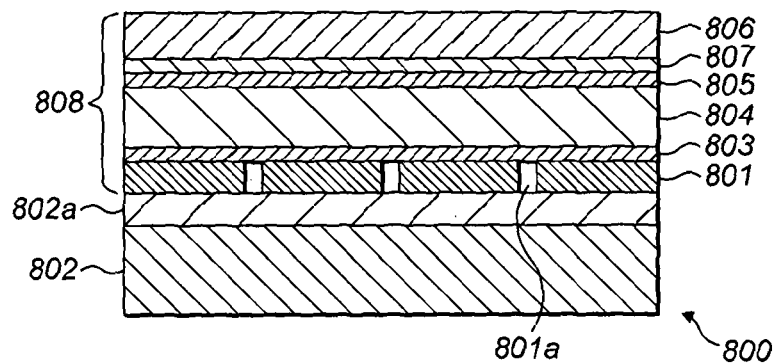
FIG. 7 is a schematic of a LCOS SLM.

The structure of an LCOS device is shown in FIG. 7.

A LCOS device is formed using a single crystal silicon substrate (802). It has a 2D array of square planar aluminium electrodes (801), spaced apart by a gap (801a), arranged on the upper surface of the substrate. Each of the electrodes (801) can be addressed via circuitry (802a) buried in the substrate (802). Each of the electrodes forms a respective planar mirror. An alignment layer (803) is disposed on the array of electrodes, and a liquid crystal layer (804) is disposed on the alignment layer (803). A second alignment layer (805) is disposed on the liquid crystal layer (404) and a planar transparent layer (806), e.g. of glass, is disposed on the second alignment layer (805). A single transparent electrode (807) e.g. of ITO is disposed between the transparent layer (806) and the second alignment layer (805).

Each of the square electrodes (801) defines, together with the overlying region of the transparent electrode (807) and the intervening liquid crystal material, a controllable phase-modulating element (808), often referred to as a pixel. The effective pixel area, or fill factor, is the percentage of the total pixel which is optically active, taking into account the space between pixels (801a). By control of the voltage applied to each electrode (801) with respect to the transparent electrode (807), the properties of the liquid crystal material of the respective phase modulating element may be varied, thereby to provide a variable delay to light incident thereon. The effect is to provide phase-only modulation to the wavefront, i.e. no amplitude effect occurs.

A major advantage of using a reflective LCOS spatial light modulator is that the liquid crystal layer can be half the thickness than would be necessary if a transmissive device were used. This greatly improves the switching speed of the liquid crystal (a key point for projection of moving video images). A LCOS device is also uniquely capable of displaying large arrays of phase only elements in a small aperture. Small elements (typically approximately 10 microns or smaller) result in a practical diffraction angle (a few degrees) so that the optical system does not require a very long optical path.

It is easier to adequately illuminate the small aperture (a few square centimetres) of a LCOS SLM than it would be for the aperture of a larger liquid crystal device. LCOS SLMs also have a large aperture ratio, there being very little dead space between the pixels (as the circuitry to drive them is buried under the mirrors). This is an important issue to lowering the optical noise in the replay field.

The above device typically operates within a temperature range of 10° C. to around 50° C., with the optimum device operating temperature being around 40° C. to 50° C., depending however on the LC composition used.

Using a silicon backplane has the advantage that the pixels are optically flat, which is important for a phase modulating device.

Whilst embodiments relate to a reflective LCOS SLM, the skilled person will understand that any SLM can be used including transmissive SLMs.

The skilled person will understand that the improved method disclosed herein is equally applicable to non display applications which may use phase retrieval techniques.

The invention is not restricted to the described embodiments but extends to the full scope of the appended claims.

The invention claimed is:

1. An iterative method of processing a pixellated image comprising image pixels to retrieve a phase distribution representative of the image in the Fourier domain, the method comprising:
   padding the image pixels with non-image pixels to increase the total number of pixels in the pixellated image, wherein the values of the non-image pixels comprises an initial random noise field;
   associating each pixel of the pixellated image with a phase value to form a first data set having plural elements, each element of the first data set having amplitude information and phase information; and
   (n+1) iterations of the following steps, where n is an integer:
      performing a Fourier transform of the first data set to produce a second data set having plural elements, each element of the second data set having amplitude and phase information;
      quantizing the phase information from the second data set;

forming a third data set having plural elements, each element of the third data set having amplitude and phase information, the phase information being derived from the second data set and;

inverse Fourier transforming the third data set to produce a fourth data set having plural elements, each element of the fourth data set having amplitude and phase information;

overwriting the amplitude and/or phase information of the fourth data set to produce a fifth data set having plural elements, each element of the fifth data set having amplitude and phase information;

wherein overwriting comprises processing the nonimage pixels differently to the image pixels and attenuating the amplitude information of each non-image pixel of the fifth data set by an attenuation factor and/or processing the amplitude information of the each image pixel utilizing a gain factor;

wherein the attenuation factor and/or gain factor are variable and dependent on the iteration number of the iterative method; and using the modified fifth data set as the first data set of the next iteration; and reconstructing the phase distribution to form a holographic reconstruction of the image.

2. A method as claimed in claim 1 wherein the non-image pixels are processed by replacing the value of at least some of the non-image pixels.

3. A method as claimed in claim 1 wherein at least some of the non-image pixels comprises those non-image pixels having a value above a predetermined threshold.

4. A method as claimed in claim 1 wherein at least some of the non-image pixels comprises all non-image pixels.

5. A method as claimed in claim 1 wherein at least some of the non-image pixels are replaced by a predetermined value.

6. A method as claimed in claim 2 wherein the non-image pixels are replaced by a random noise field.

7. A method as claimed in claim 1 wherein the random noise field is an initial random noise field for the first iteration.

8. A method as claimed in claim 1 wherein the non-image pixels form a border around the image pixels.

9. A method as claimed in claim 1 wherein the image is the nth frame of a 2D sequence of video frames.

10. A projection system comprising:
a processor arranged to perform the method of claim 1;
a spatial light modulator arranged to display the phase distribution;
a light source arranged to illuminate the spatial light modulator; and
a Fourier transform lens arranged to perform an optical frequency-space transformation on the light output from the spatial light modulator.

11. A head-up display comprising the projector as claimed in claim 10.

12. A projection system comprising:
a processor arranged to:
receive a pixellated image comprising image pixels;
padding the image pixels with non-image pixels to increase the total number of pixels in the pixellated image, wherein the values of the non-image pixels comprise an initial random noise field;
associate each pixel of the pixellated image with a phase value to form a first data set having plural elements, each element of the first data set having amplitude information and phase information; and
(n+1) iterations of the following steps, where n is an integer:
perform a Fourier transform of the first data set to produce a second data set having plural elements, each element of the second data set having amplitude and phase information;
quantize the phase information from the second data set;
form a third data set having plural elements, each element of the third data set having amplitude and phase information, the phase information being derived from the second data set and;
inverse Fourier transform the third data set to produce a fourth data set having plural elements, each element of the fourth data set having amplitude and phase information;
overwrite the amplitude and/or phase information of the fourth data set to produce a fifth data set having plural elements, each element of the fifth data set having amplitude and phase information; wherein overwriting comprises processing the non-image pixels differently to the image pixels and attenuating the amplitude information of each non-image pixel of the fifth data set by an attenuation factor and/or processing the amplitude information of the each image pixel utilizing a gain factor; wherein the attenuation factor and/or gain factor are variable and dependent on an iteration number; and
use the modified fifth data set as the first data set of a next iteration;
a spatial light modulator arranged to display a phase distribution;
a light source arranged to illuminate the spatial light modulator; and
a Fourier transform lens arranged to perform an optical frequency-space transformation on the light output from the spatial light modulator to form a holographic reconstruction of the image.

* * * * *